(12) United States Patent
Mannengal et al.

(10) Patent No.: US 12,231,520 B2
(45) Date of Patent: Feb. 18, 2025

(54) INTELLEGENT QUEUING OF RULES BASED COMMAND INVOCATIONS

(71) Applicant: Microsoft Technology Licensing, LLC, Redmond, WA (US)

(72) Inventors: Arun R. Mannengal, Sammamish, WA (US); Madhavan Kesavan, Redmond, WA (US); Tanmay D. Bhagwat, Bellevue, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 0 days.

(21) Appl. No.: 17/822,711

(22) Filed: Aug. 26, 2022

(65) Prior Publication Data

US 2023/0179682 A1    Jun. 8, 2023

Related U.S. Application Data

(63) Continuation of application No. 16/773,900, filed on Jan. 27, 2020, now Pat. No. 11,470,184.

(60) Provisional application No. 62/947,500, filed on Dec. 12, 2019.

(51) Int. Cl.
*H04L 67/61* (2022.01)
*H04L 47/6275* (2022.01)
*H04L 67/10* (2022.01)

(52) U.S. Cl.
CPC .......... *H04L 67/61* (2022.05); *H04L 47/6275* (2013.01); *H04L 67/10* (2013.01)

(58) Field of Classification Search
CPC ...... H04L 67/61; H04L 47/6275; H04L 67/10
USPC .......................................................... 709/206
See application file for complete search history.

(56) References Cited

U.S. PATENT DOCUMENTS

| | | | |
|---|---|---|---|
| 10,361,985 B1* | 7/2019 | Shveykin | H04L 67/568 |
| 10,691,501 B1* | 6/2020 | Hussain | G06F 9/485 |
| 2013/0036427 A1* | 2/2013 | Chen | G06F 9/546 |
| | | | 719/312 |
| 2014/0195659 A1* | 7/2014 | Jaroch | G06F 9/4843 |
| | | | 709/223 |

(Continued)

OTHER PUBLICATIONS

"Notice of Allowance Issued in European Patent Application No. 20816052.3", Mailed Date: May 17, 2023, 8 Pages.

(Continued)

*Primary Examiner* — Nicholas R Taylor
*Assistant Examiner* — Chong G Kim
(74) *Attorney, Agent, or Firm* — Foley IP Law, PLLC

(57) ABSTRACT

Constraint based command invocations are dynamically queued in a cloud queue such that aspects of remote user devices may be remotely controlled with reduced exposure to inconvenient remotely issued commands. By monitoring conditions that may trigger command invocations, verifying rules of associated constraints prior to queuing command invocations, evaluating parameters to prioritize command invocations in a dynamic issuing order within cloud queue, examining factors and reverifying previously verified rules when determining whether to transmit a command from an command invocation located at a transmission position of the cloud queue, systems and methods herein provide a constrained environment within which user devices may be remotely controlled relatively free from unexpected cloud caused encumbrances during inopportune moments.

22 Claims, 10 Drawing Sheets

(56) References Cited

U.S. PATENT DOCUMENTS

| | | | |
|---|---|---|---|
| 2017/0060629 A1* | 3/2017 | Vora | G06F 9/542 |
| 2017/0078049 A1* | 3/2017 | Bray | H04L 41/344 |
| 2017/0099362 A1* | 4/2017 | Almond | H04L 63/08 |
| 2019/0065052 A1* | 2/2019 | Jean | G06F 3/0655 |
| 2019/0121545 A1* | 4/2019 | La Fratta | G06F 3/061 |
| 2022/0345435 A1* | 10/2022 | Agrawal | G06V 10/993 |

OTHER PUBLICATIONS

"Decision to Grant Issued in European Patent Application No. 20816052.3", Mailed Date: Sep. 7, 2023, 2 Pages.

* cited by examiner

INTELLIGENT QUEUING OF RULES BASED COMMAND INVOCATIONS

CROSS-REFERENCE TO RELATED APPLICATIONS

This application is a continuation application of and claims priority to U.S. patent application Ser. No. 16/773,900, entitled "INTELLIGENT QUEUING OF RULES BASED COMMAND INVOCATIONS," filed on Jan. 27, 2020, which claims priority to U.S. Provisional Patent Application No. 62/947,500, entitled "CLOUD COMMAND DEVICE OPERATIONS OPTIMIZATION," filed on Dec. 12, 2019, the disclosures of which are incorporated herein by reference in their entireties.

BACKGROUND

User side devices and server side devices continue to exchange information at increasing rates. As a result, user side devices and server side device may share data storing, collection, and processing responsibilities with each other. However, sharing responsibilities between devices conventionally comes at the cost of sharing control between devices. Traditionally, shared control between devices provides for increased vulnerability and reduced protection, neither of which is desirable in distributed computing environments.

SUMMARY

According to one aspect disclosed herein, there is provided a method of operating a cloud computing environment to monitor, by one or more cloud computing processors, conditions associated with at least one network connected device; and responsive to the monitoring, request a command invocation associated with the at least one network connected devices to be queued. Further, responsive to the requesting, exemplary methods verify a set of rules associated with constraints of the at least one network connected device is satisfied; and responsive to the verification, determine that the command invocation is to be queued in a cloud queue that defines a dynamic issuing order of a plurality of command invocations associated with a plurality of network connected devices. Further still, example methods identify a priority rank of the command invocation based on one or more parameters associated with the command invocation and select a position for the command invocation within the dynamic issuing order based at least on the identified priority rank of the command invocation. Moreover, example methods queue the command invocation within the cloud queue according to the selected position.

According to another aspect disclosed herein, there is provided a system of a cloud computing environment including one or more cloud gateways operable to receive communications from one or more network connected devices and at least one cloud queue that defines a dynamic transmission order of a plurality of command invocations addressed to a plurality of remote devices. Exemplary systems further include one or more cloud memories accessible by one or more processors that monitor the one or more network connected devices based at least on information obtained from the one or more cloud gateways responsive to the received communications, wherein the one or more processors also verify, based at least on the obtained information, satisfaction of a set of rules associated with at least one network connected device, of the one or more network connected devices. In examples, the one or more processors, responsive to the verified satisfaction, also determine that a command invocation addressed to the at least one network connected device is to be queued in the cloud queue and identify a priority rank of the command invocation based on one or more parameters associated with the command invocation. Yet further, the exemplary one or more processors select a position for the command invocation within the cloud queue based at least on the identified priority rank of the command invocation while the example cloud queue queues the command invocation with the plurality of command invocations according to the selected position.

According to another aspect disclosed herein, there is provided a cloud solution service system comprising one or more cloud gateways operable to receive communications from at least one network connected device; and a cloud solution service including at least one processor and a plurality of software services configured to trigger a command in response to satisfaction of a set of conditions. The at least one processor is configured to queue a command responsive to a determination of a software service of the plurality of software services that conditions received by the cloud gateway in a communication from at least one network connected device indicate satisfaction of the set of conditions of the software service, and the at least one processor is further configured to issue the queued command responsive to a validation that constraints from a software model interface cached at the cloud gateway as corresponding to the network connected device are satisfied.

In embodiments the methods may comprise operations in accordance with any of the embodiments disclosed herein.

According to another aspect disclosed herein there is provided software (e.g. an operating system) embodied on a computer-readable medium and configured so as when run on one or more processors to perform operations in accordance with any of the methods disclosed herein.

According to another aspect disclosed herein, there is provided a computer system comprising one or more processors and memory comprising one or more memory units arranged to store code arranged to run on the one or more processors, the code being configured so as when run to perform operations in accordance with any of the methods disclosed herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

BRIEF DESCRIPTION OF THE DRAWINGS

To assist understanding of embodiments disclosed herein and to illustrate how such embodiments may be put into effect, reference is made, by way of example only, to the accompanying drawings in which.

Corresponding reference characters indicate corresponding parts throughout the drawings.

DETAILED DESCRIPTION

Figure 1:
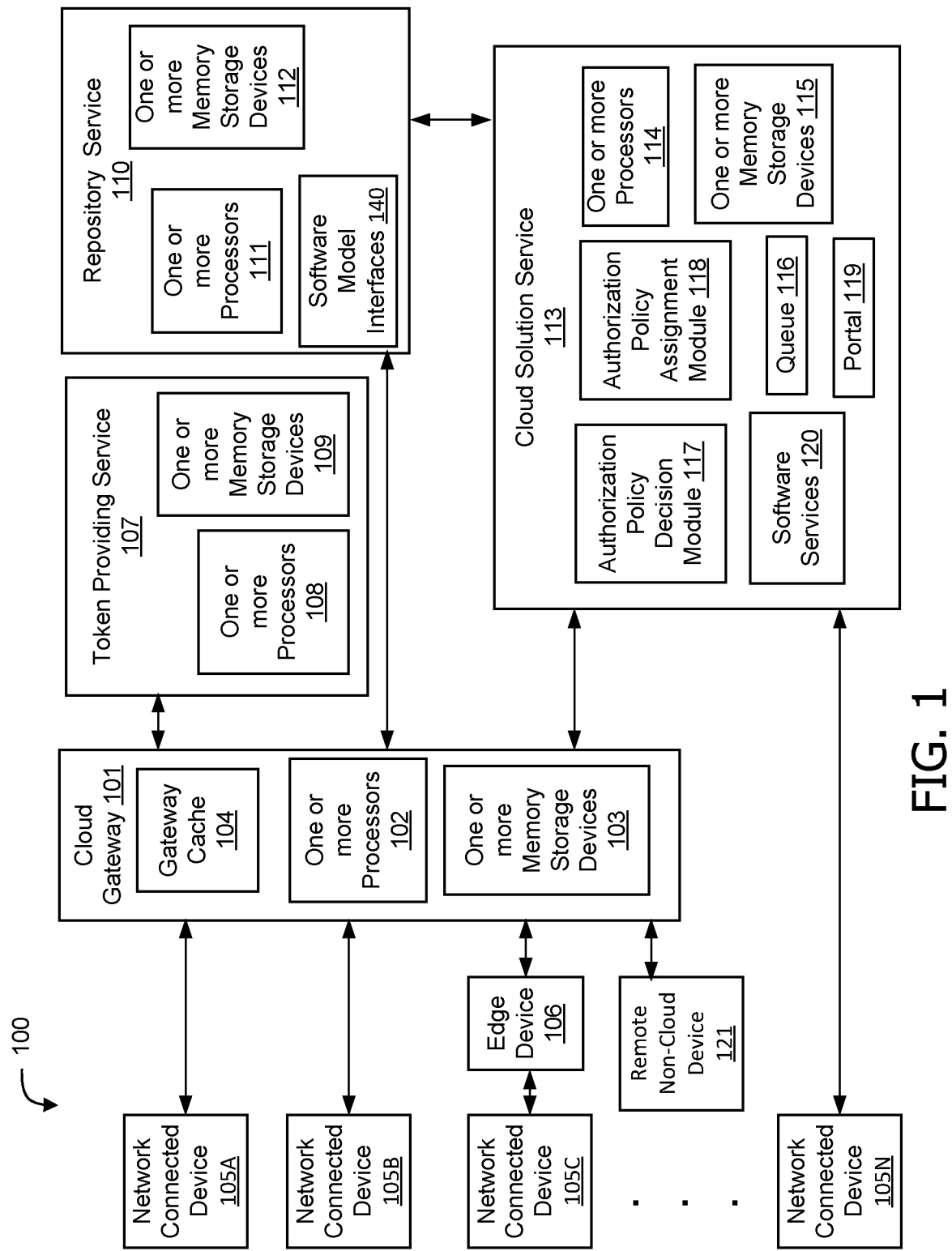
FIG. 1 illustrates an example computer system 100 of a cloud environment.

Devices typically process information to monitor conditions affecting the device, expend resources to determine whether the conditions warrant triggering of a command, and in response to the determination, may generate and execute one or more actions of the command. Off-loading some or all device processing to remote processing services relieves some of the processing burdens presently experienced by devices, for example, internet of things (IoT) devices. However, conventional attempts at off-loading processing decisions have caused user devices or fleets of devices to be vulnerable to third-party decision-making issues (e.g., restarting devices at inconvenient times).

Device modeling minimizes traditional vulnerabilities caused by conventional third-party decision-making through explicit interaction contracts, which define approved and disapproved interactions between cloud servers and IoT devices. Model interfaces, as described herein, are used to express interaction rules by describing device capabilities, constraints, and/or definitions thereby creating a constrained environment within which a remote service (e.g., cloud service) exerts control over one or more user devices. The constrained environment improves previous remote service technology by creating strict guidelines on remotely generated and/or issued device code that may affect user devices.

The interaction rules may further provide for cloud solutions that create customized and/or dynamically constrained environments for one or more IoT devices and/or one or more users, which may create constrained environments for one or more groups of IoT devices. Cloud solutions may control a number of devices, and some cloud issued commands consume significant time and processing resource to execute, which may cause device shutdowns, resets, and/or reconnects. Providing customized and/or dynamically constrained environments assures cloud solution operators and device users that remotely issued command calls meet expectations based on the constraints.

Constrained environments improve cloud computing systems and IoT devices by decoupling some or all decision-making processing between an IoT device and a cloud solution deployed on a cloud computing system, while ensuring a device's or fleet of devices' integrity and availability. Decoupling a decision-making process reduces communication chatter therebetween and conserves processing resources of the cloud computing system and the user devices, while maintaining device integrity by enforcing strict guidelines regarding whether a decoupled decision causes a user device to actually execute a remotely issued command. For example, conventional polling mechanisms may be minimized and/or eliminated, thereby conserving valuable computing processing and network communication resources, which were previously consumed by polling mechanisms.

Constrained environments further improve cloud computing systems and IoT devices by providing a mechanism that reduces and/or prevents the transmission of cloud issued commands that an IoT device may ultimately decide to ignore. For example, a cloud solution may queue a command based on monitored conditions, but due to latency between the moment the command queues and the moment the remote device receives the command, the conditions may have passed and/or other conditions may have occurred, which may cause the device to decide to ignore the transmitted cloud issued command. For instance, based on a time of day condition, a cloud solution may queue a command directed to an IoT sprinkler that when executed by the sprinkler causes a sprinkler to distribute water. However, at the moment the IoT sprinkler receives the command, a rain detected condition and/or freezing temperature detected condition may cause the IoT sprinkler to ignore the transmitted cloud issued command. Constrained environments, as described herein, may prevent transmission of such a command thereby conserving processing resources of cloud computers and user devices as well as reducing network congestion.

Further, a constrained environment may relieve some or all of a cloud solution operator's concern of accidentally issuing commands under circumstances that may inadvertently hamper and/or damage a device and/or fleet of devices. Exemplary cloud solution services may be managed by an operator having limited understanding of an industry's particular needs, and a constrained environment customized for specific IoT devices or fleet of devices reduces and/or prevents a cloud solution operator from drafting cloud servicing code that might issue a command at an inopportune time. For example, a constrained environment may prevent a fleet of connected delivery vehicles from performing a routine system update during a peak delivery period (e.g., a region's holiday season) and/or a peak delivery time (e.g., after hours while stores are closed to the public). Further still, constraints defined by interaction rules may be tested in deterministic tests prior to deployment and then deployed upon satisfactory results.

Following is one example of computing system within which principles of the present disclosure may be utilized. FIG. 1 illustrates an exemplary computer system 100 that includes a cloud gateway 101 configured to interact with one or more remote systems. In examples, cloud gateway 101 may include one or more processors 102, one or more memory storage devices 103, and gateway cache 104. Cloud gateway 101 communicates with one of more network connected devices 105A-105N, which in examples may communicate via edge device 106. One or more network connected devices 105A-105N may be an IoT device and may be owned, manufactured, and device coded by first or third parties. A user of one or more network connected devices 105A-105N may be one or more entities. An entity may refer to a person, a family, a building, a store, a company, and/or the like.

Figure 2:
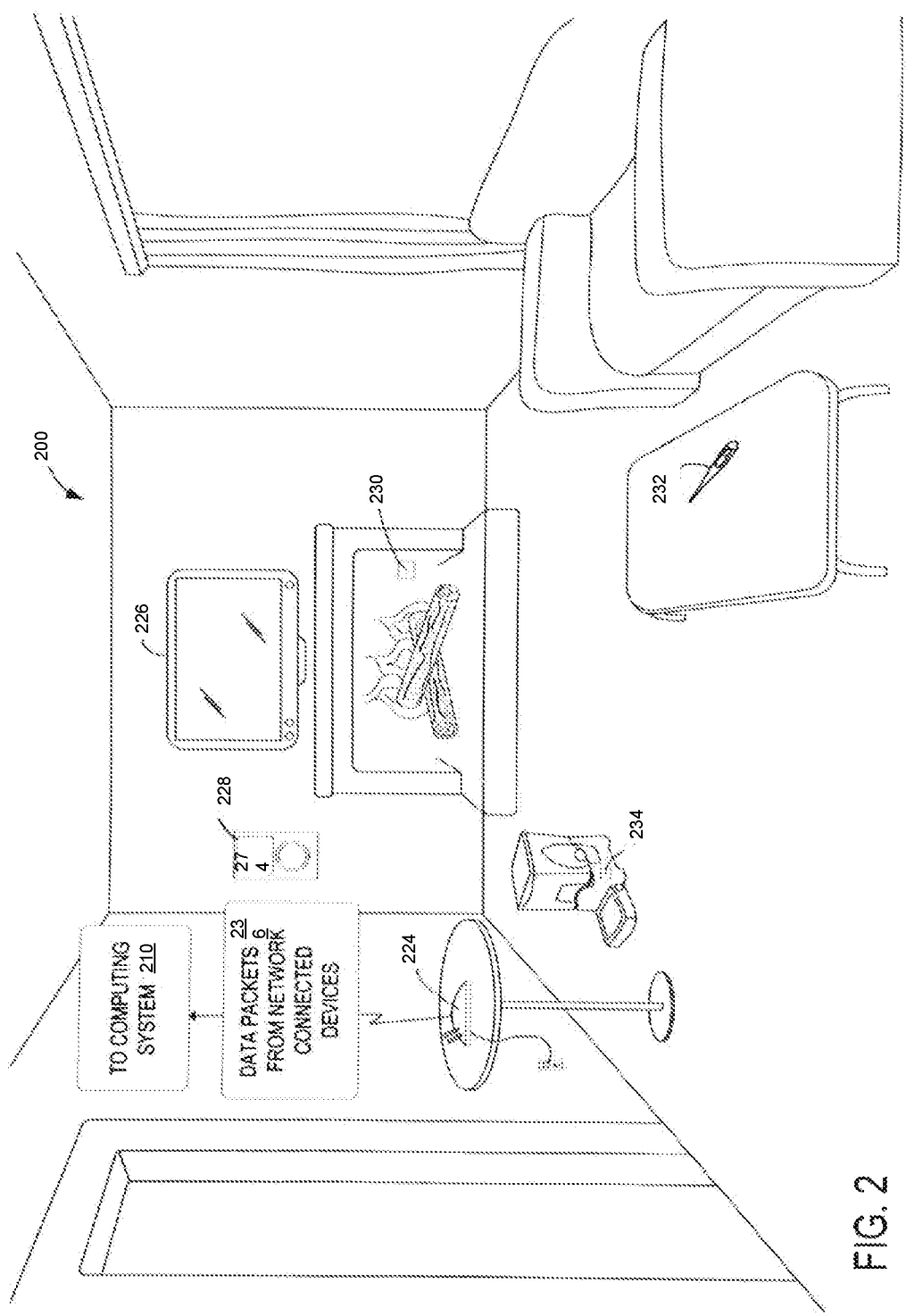
FIG. 2 shows an example of the physical environment 200 of plurality of network connected devices of FIG. 1.

FIG. 2 illustrates an example of a plurality of network connected devices, such as one or more network connected devices 105A-105N in FIG. 1, distributed around an example physical environment 200, namely, a house of a user. The network connected devices may be configured to connect to a wide area network (WAN) via a router 224. In examples, the router 224 may take the form of a wireless network device mediating a wireless network that may be utilized by the plurality of network connected devices 105A-105N in the physical environment 200. In another example, the plurality of network connected devices 105A-105N may be configured to communicate with a user computing device 226 configured to connect to the WAN via the router 224.

The plurality of network connected devices 105A-105N may take different forms and may perform different processes and functions. In the example illustrated in FIG. 2, the network connected devices 105A-105N may include a thermostat 228 having an interactive display 274, a fireplace thermometer 230, a body thermometer 232, and a pet food measuring device 234. It should be appreciated that the specific example network connected devices 105A-105N illustrated in FIG. 2 are merely exemplary, and that the network connected devices may take other suitable forms. As a few other non-limiting examples, the network connected devices 105A-105N may take the form of a GPS unit, a vibration/movement sensor, printer, router, lights, HVAC unit, robot, smart speaker, smart watch, asset tracker, a speaker, a smart coffee machine, a refrigerator sensor, other types of sensors and measurement devices, other types of consumer or industrial IoT devices, etcetera, that include processors, memory, stored programs, and communications interfaces and are able to connect to remote servers via computer networks. In the example illustrated in FIG. 2, each network connected device is configured to measure a physical parameter, such as a temperature or a pet food level. However, it should be appreciated that the network connected devices 105A-105N may take other forms that do not necessarily measure physical parameters, such as, for example, a network connected output device such a printer or display.

In one example, each network connected device may include a processor or another type of hardware-logic component such as, for example, field-programmable gate arrays (FPGAs), program- and application-specific integrated circuits (PASIC/ASICs), program- and application-specific standard products (PSSP/ASSPs), system-on-a-chip (SOC), complex programmable logic devices (CPLDs), etc. The processor of each network connected device 105 may be configured to collect measured physical values via a sensor, perform a process or output, etc. The processor of each network connected device may be further configured to send data packets 236 (e.g., messages) from the network connected device 105 to the computing system 210 via the wireless network mediated by the router 224 and/or via a user computing device 226. In the illustrated example, the user computing device 226 takes the form of a large format display, and may include its own processor, non-volatile storage, volatile storage, and other suitable computer components. However, it will be appreciated that the client computer device 226 may take other suitable forms, such as, for example, a desktop computer device, a laptop computer device, smartphone, tablet computer device, wearable device, etc.

Referring back to FIG. 1, computer system 100 may also include one or more services that may be deployed in a cloud-based environment. For example, token providing service 107 may be a first or third-party service that includes one or more processors 108 and one or more memory storage devices 109. Token providing service 107 may communicate with cloud gateway 101, one or more other services, one or more remote processors and/or one or more remote memory storage devices. In examples, token providing service 107 communicates with and provides tokens for security purposes, for example, when determining whether one or more network connected devices 105A-105N or remote non-cloud device 121 are authorized to send and/or receive communications from cloud gateway 101 and/or cloud solution services.

Another example service of computer system 100 is repository service 110, which may be a first or third-party service that includes one or more processors 111 and one or more memory storage devices 112. Repository service 110 may communicate with cloud gateway 101, one or more other services, one or more remote processors and/or one or more remote storage devices. In examples, repository service 110 is configured to store and manage a plurality of software model interfaces 140. In one example, the plurality of software model interfaces 140 may be provided by and controlled by the cloud solution service 113. The plurality of software model interfaces 140 may further include custom software model interfaces that are created (e.g., via portal 119) by manufacturers of network connected devices 105A-105N, users of network connected devices 105A-105N, operators of the cloud solution service 113, or other users of the computing system 100. Each software model interface of software model interfaces 140 defines explicit interaction rules between network connected devices 105A-105N operated by customers and/or users of the computing system 100 and software services 120 created by developers. One or more explicit interaction rules expressed as one or more data files that defines the schemas and protocols according to which data, including executable code, should be sent and received between a client and server, for example.

In examples, one or more systems/devices of computing system 100 and physical environment 200 may provide systems, mechanisms, and processes that securely share software model interfaces 140 across one or more network connected devices 105A-105N interacting with one or more instances of cloud solution service 113 through cloud gateway 101. One or more instances of a cloud solution service 113 may be a first or third party service that includes one or more memory storage devices 115 and one or more processors 114. The one or more network connected devices 105A-105N may communicate with cloud gateway 101 and/or cloud solution service 113 in a manner that protects proprietary or otherwise secret code and/or information of the software model interfaces 140. In examples, computer system includes one or more modules providing for secure information sharing, and examples of such modules include authorization policy decision module 117 and authorization policy assignment module 118. An example module may be computer executable program code that is stored in one or more local storage devices and/or remote storage devices and is executed by one or more local processors and/or remote processors. An example authorization policy decision module 117 may be executed to perform authorization checks using a token that was issued from a trusted token providing service 107 to ensure that a received software model interface is authentic and/or that a device attempting to access a software model interface is approved. An exemplary authorization policy assignment module 118 may be executed to assign one or more network connected devices 105A-105N as having access to and/or being constrained by a particular software model interface.

In some examples, a cloud environment may communicate with remote computing systems that are not part of the cloud-based system, for example, remote non-cloud device 121. Example remote non-cloud devices may be user devices, servers, relays, memories, and/or the like, which may or may not be part of another cloud based system that is different from the cloud based system including cloud gateway 101, cloud solution service 113, token providing service 107, and/or repository service 110.

Cloud solution service 113 executes one or more software services 120, which may be stored on local and/or remote storage devices and executed by local and/or remote processors. Example software services 120 provide cloud-based solutions for users. In examples, a software services 120 may be executed by one or more processors 114 to monitor conditions of one or more network connected devices 105A-105N. Software services 120 may be developed by the manufacturers of the network connected devices 105A-105N, by third party developers unrelated to the manufacturers of the network connected devices 105A-105N, by users of the network connected devices 105A-105N, by operators of cloud solution service 113, and/or by other users of the computing system 100. In examples, cloud solution service 113 may include at least one portal 119 and at least one queue 116 (e.g., for requests for command from one or more software services 120). In examples, cloud solution service 113 may communicate with cloud gateway 101, one or more network connected device 105A-105N, one or more other services, one or more remote processors and/or one or more remote storage devices.

As mentioned above, software services 120 provide cloud-based solutions for users. Software services 120 may obtain information conditions of one or more network connected devices 105A-105N from cloud gateway 101 and/or from one or more of network connected devices 105A-105N themselves. Upon detection of certain conditions, software services 120 may determine that one or more of the network connected devices 105A-105N would benefit from performing an action and decide to queue a request that the action be performed in queue 116. For example, a software service 120 may be a cloud solution module that detects a fire condition and queues a request that one or more IoT sprinklers distribute water.

However, conditions utilized by software services 120 to decide to queue a request that the action be performed may not take into consideration unique factors of a particular group of network connection devices. For example, while buildings may generally benefit from sprinklers distributing water in response to the detection of fire conditions, a group of sprinklers located within a particular sector of the building may want to create constraints that limit the environments within which software services 120 is free to make decisions on behalf of the group of sprinklers in that particular sector of the building (e.g., an art gallery).

Software model interfaces 140 may be computer executable code stored in association with one or more network connected devices 105A-105N that defines constraint environments. In these examples, when variables are satisfied such that a software service triggers invocation of a command, cloud solution service 113 and/or cloud gateway 101 may check constraints defined in software model interfaces 140 before transforming the command invocation into an issued command and transmitting the command to network connected devices 105A-105N corresponding thereto.

Constraints may be any attribute, including but not limited to, time, geo location, temperature, humidity, altitude, and/or the like. Constraints may be primitive attributes, processing attributes, memory attributes, and/or the like. Constraints may include relationships between attributes and/or network connected devices 105A-105N. For example, if network connected device 105A is in proximity to network connected device 105B with attribute x, then command a is transmitted or command a is not transmitted.

In another instance, if a monitored temperature breaches a threshold b, then command c is transmitted to one or more network connected devices.

Constraints may be based on quality of service agreements, privilege status of a user, an amount of devices receiving or otherwise affected by the command, downstream operations affected by the command, payload of the command, time associated with executing the command, load balancing, network balancing, any other examples provides herein, and/or any combination thereof. Constraints of a software model interface may be defined to establish any variety of constricted environments agreeable to a user and cloud solution service. Further, the constraints may be enforced by utilizing a set of conditions corresponding to the constraints that are initially evaluated to decide if a command is initially put into a queue.

When large groups of network connected devices 105A-105N are being monitored, the size of queue 116 can grow significantly and may cause unexpected latency issues that may possibly lead to unintended constraint violations and/or the transmission of stale commands as monitored conditions change over time. Latency and queue size problems may be resolved by systems and methods distinguishing command invocations, issued commands, transmitted commands, and executed commands.

As described herein, a command invocation is a request that a command be executed. For example, responsive to monitored conditions, a software service may trigger a command invocation, which requests that a command ultimately be executed by one or more network connected devices, but as will be described below, a command invocation may not ultimately be executed by a user device for one or more reasons. Command invocations may be queued within and traverse through queue 116.

After a command invocation traverses queue 116, one or more processors transforms a command invocation into an issued command. An issued command includes computer executable code that when executed causes a device to perform an action. The one or more processors may generate an issued command and/or obtain an issued command from one or more memories. The processors and/or memories may be local and/or remote.

When the command invocation is transformed into an issued command, one or more transmitters and/or transceivers of the cloud system transmits the issued command. An issued command that is being transmitted and/or has been transmitted is a transmitted command. A transmitted command includes computer executable code that when executed causes a device to perform an action. Further a transmitted command includes an indication of a destination device of the transmitted command. One or more network connected devices may receive a transmitted command.

When a network connected device receives a transmitted command, the command may be referred to as a transmitted command and/or received command. After receiving a transmitted command, one or more processors of the network connected device may process the transmitted command such that executable device code of the transmitted command is executed by one or more processors of the network connected device. During and upon execution of executable device code of the transmitted command, the transmitted command is transformed into an executing command and executed accordingly. The execution of executable device code of a transmitted command by a processor of a network connected device causes the network connected device to perform an action.

Distinguishing command invocations, issued commands, transmitted commands, and executed commands improves traditional cloud computing environments at least because various processes, tests, and verifications may be performed at various steps along a command's transformation to dynamically control the size of a queue and intelligently and dynamically position command invocations within a queue, which improves the technology by reducing latency issues experienced by conventional large cloud queues. Further, performing various processes, tests, and verifications at various steps along a command's transformation avoids issuance of undesired command invocations, as defined by a constrained environment, thereby protecting device users from inadvertent (or nefarious) commands that may negatively impact their devices. Further still, performing various processes, tests, and verifications at various steps along a command's transformation reduces network congestion and conserves processing expenditures by avoiding the transmission of stale commands and/or commands that may not be received by a user device.

Figure 3:
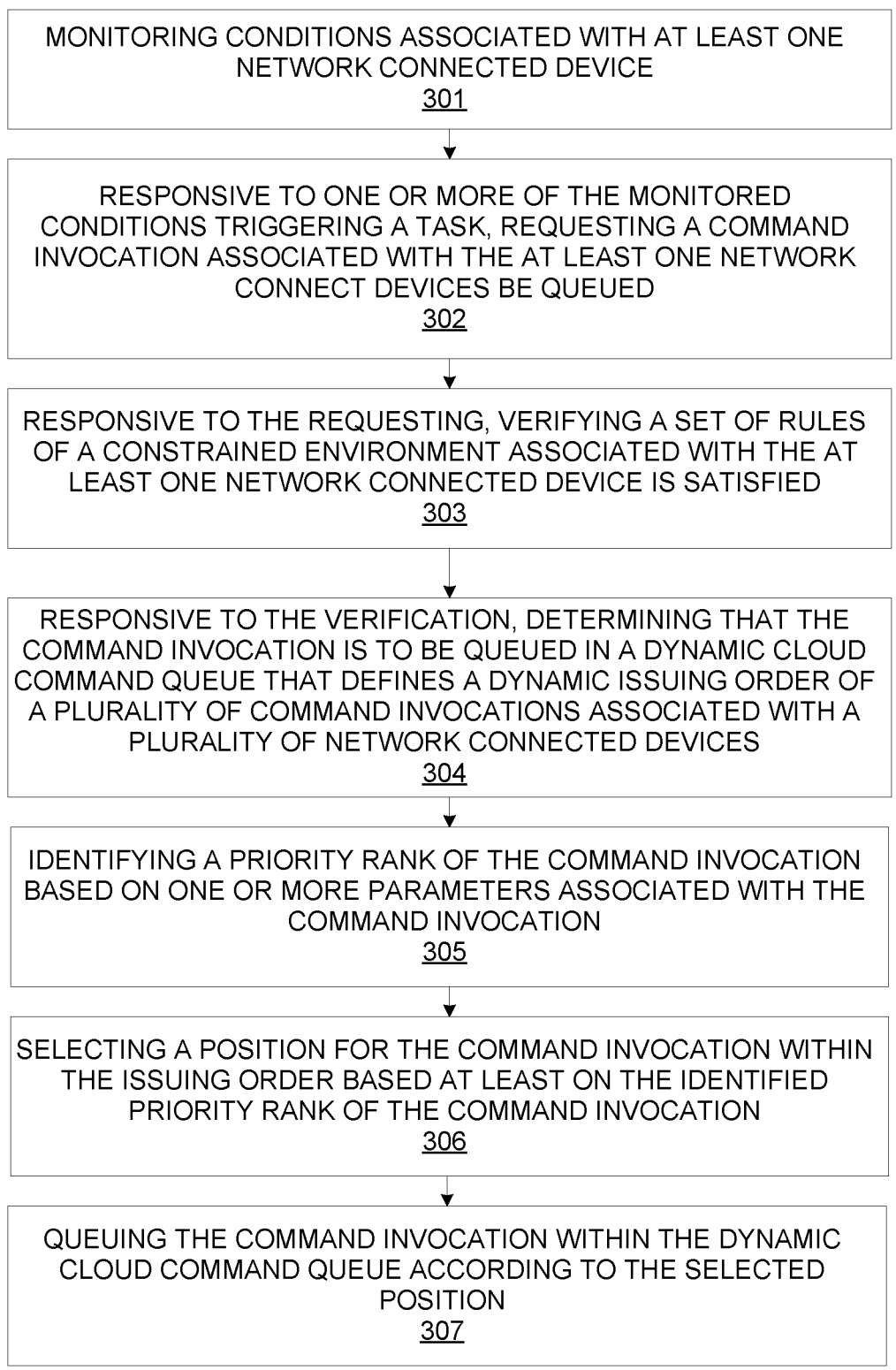
FIG. 3 is an example flow diagram illustrating an example method 300.
Figure 4:
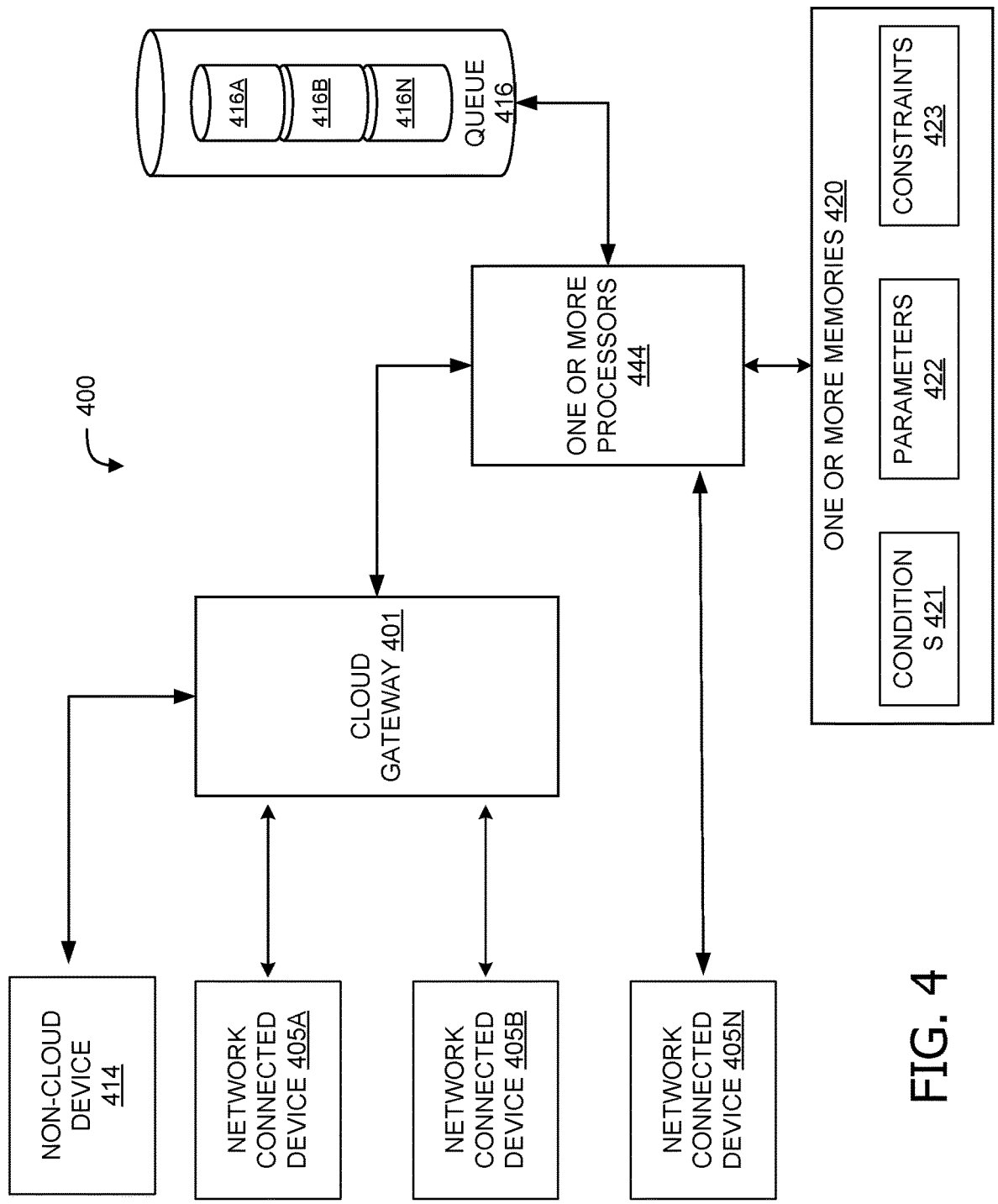
FIG. 4 illustrates an example computer system 400 of a cloud environment.

FIG. 3 is a flow diagram illustrating an example method 300. Various operations of example method 300 may be performed by any of the exemplary computer systems described herein (e.g., FIGS. 1, 4, 6, and 11). To aid in understanding, FIG. 3 is described below in conjunction with FIG. 4, which illustrates an example computer system 400 of a cloud environment.

At operation 301, one or more processors 444 monitor conditions 421 associated with at least one network connected devices 405A-405N. Examples conditions 421 may be one or more defined combination of any attribute, including but not limited to, time, period frequency, geo location, temperature, humidity, altitude, and/or the like. Conditions 421 may be any primitive attributes, processing attributes, memory attributes, software and/or operating system attributes, and/or the like. For instance, one or more processors may monitor for new software releases and/or updates (e.g., app, operating system, or the like) associated with one or more network connected devices.

In instances, one or more conditions 421 associated with one or more network connected devices 405A-405N may be detected via information obtained by one or more cloud servers from one or more network connected devices 405A-405N, other portions of the cloud system (e.g., cloud gateway 401), and/or remote devices outside the control of the cloud system (e.g., remotely located non-cloud device 414), indicating the existence and/or occurrence of the one or more conditions. In an example storage facility, network connected devices 405A-405N may be devices of the storage facility that operated under control of one or more processors of the cloud based service, and example remotely located non-cloud device 414 may be one or more servers of a government regulatory commission, which may be a third party regulatory entity.

At operation 302, in response to the monitoring, one or more processors 444 may request a command invocation associated with at least one network connected devices 405A-405N, be queued in cloud queue 416. In examples, while monitoring conditions 421 of one or more network connected devices 405A-405N, one or more processors 444 may detect that one or more conditions 421 occurred and/or exists and responsive thereto request a command invocation. For instance, in response to one or more processors 444 detecting a new software release and/or update associated with one or more network connected devices 405A-405N, one or more processors 444 may request the queuing of a command invocation including a command that one or more network connected devices download and execute the new software release and/or update. In other instance, detecting an expiration of a period of time may cause one or more processors 444 to request the queuing of a command invocation including a command that one or more network connected devices 405A-405N upload data to a remote processor/memory (e.g., cloud gateway 401, one or more processors 444, one or more memories 420, and/or another processor/memory).

In some examples, a processor at operation 302 requesting a command invocation does not necessarily guarantee that the command invocation will be queued. Constraints 423 associated with one or more network connected devices 405A-405N may first be checked to determine whether the command invocation is appropriate for queuing. A plurality of constraints 423 that may be associated with a plurality of different sets of one or more network connected devices 405A-405N and may be stored in one or more memories 420 that are accessible by one or more processors 444.

One or more constraints 423 may be associated with a device set including one or more of network connected devices 405A-405N, while one or more other constraints 423 may be associated with another device set including one or more of network connected devices 405A-405N. While the first device set includes a different grouping of network connected devices as compared to the other device set, the first device set may share one or more common network connected devices with the other device set. Further, while the first device set is associated with a different combination of constraints as compared to the other device set, the first device set, and the other device set may be associated with one or more common constraints. For instance, an example first device set may include network connected devices 405A, 405B, and 405C, and the example first device set may be associated with constraints x, y, and z of constraints 423. Furthermore, the other example device set may include network connected devices 405A and 405N, and the other example device set may be associated with constraints w, y, and z of constraints 423.

At operation 303, responsive at least to the requesting of operation 302, one or more processors 444 verify whether a set of rules of a constrained environment associated with at least one network connected devices is satisfied and/or violated should the command invocation be queued at that time. In instances, one or more constraints 423 may define rules which prevent some actions from being executed under defined circumstances, request some actions be executed under the same or different circumstances, and/or allow some actions to be executed under the same or different circumstances. For example, a constraint 423 may define a plurality of rules, such as but not limited to, if attribute d exists, then a command causing one or more of actions e, f, and/or g may (or may not) be executed by one or more network connected devices 405A-405N. Another example rule indicates that while a defined combination of attributes h, i, and/or j, exist, a command causing one or more of actions e, f, g, and/or n may (or may not) be executed by one or more network connected devices 405A-405N.

Continuing the monitored storage facility example, example constraints 423 may define rules ensuring that while one or more monitored temperature readings of a storage sector exceeds a troubling threshold, cooling devices that are located within sectors of the troubled storage sector may be prevented from executing commands associated with non-cooling functions (e.g., software updates, weekly reports, and/or other defined non-cooling functions) in order to satisfy compliance with constraints 423. In another example that demands one or more actions, one or more rules of constraints 423 may define that within time period x (e.g., a number of minutes, hours, days, etc.) of the resolution of a temperature event y (e.g., over-heating, over-cooling, threshold temperature deltas within a period, etc.), some or all network connected devices (e.g., 405A-405N but excluding network connected device 405B) should execute reporting actions a, b, and/or c (e.g., temperature with respect time reports, resolution procedures that were conducted, success and failure analysis of one or more resolution procedures that were conducted, video and image surveillance footage recordings from effected sectors, etc.) in order to satisfy compliance with constraints 423.

In another example that does not prevent or demand execution of one or more actions, but rather, allows one or more actions to be executed by one or more network connected devices 405A-405N should it be determined to be desirable given the environment, one or more rules of constraints 423 may define that when communication traffic is below a threshold x and/or the time of day is between y and z (e.g., 8 pm and 5 am central standard time), particular network connection devices (e.g., devices of one section but not devices of an adjacent sector) may execute commands causing the actions a, b, and/or c (e.g., generation and transmission of inventory reports, generation and transmission of usage reports, downloading and installation of new software and/or updates, etc.) without violating compliance with constraints 423.

At operation 304, responsive to the verification that rules of the constraints 423 associated with one or more network connected devices 405A-405N that may be affected by the command invocation are satisfied and/or not violated, one or more processors 444 at operation 304 determines that the command invocation is to be queued in queue 416. Furthermore, detail regarding alternative operations that may be performed should operation 303 verify that rules of the constraint environment are not satisfied and/or are violated are described below in FIG. 9.

In examples, queue 416 is a cloud queue that defines a dynamic ordering of a plurality of command invocations associated with a plurality of network connected devices 405A-405N. Queue 426 may be ordered according to an issuing order, such that command invocations travel toward the front of the queue, where a command invocation might issue into an issued command, in order of the issuing order. Prior to queuing a command invocation within queue 416, one or more processors 444 perform example operations 305 and 306 to determine the where within the issuing order of queue 416 the command invocation will be positioned.

At operation 305, one or more processors 444 identify a priority rank of the command invocation based on one or more parameters 422 associated with the command invocation. Organizing command invocations within the queue according to priority allows higher priority command invocations to traverse queue 416 more quickly than lower priority command invocations thereby causing queue 416 to be intelligently organized in a way that reduces traditional latency issues, at least for higher priority command invocations.

One or more parameters 422 may be defined by an operator of a cloud solution service (e.g., cloud solution service 113) and/or user of one or more network connected devices 105A-105N. Parameters 422 may be stored in one or more memories 420 that are accessible by one or more processors 444. Example parameters may include, but are not limited to, device types, certain instances within a device type, command types, certain instances within a command type, flags, quality of service agreements, users' priority status (e.g., a customer may pay increased rates for an increase status), an amount of devices receiving or otherwise affected by a command, downstream operations effected by a command, other commands affected by a command, payload of a command, time associated with executing a command, load balancing, network balancing, any other examples of considerations provided herein, and/or any combination thereof.

Parameters 422 may be considered by one or more processors 444 alone and/or in combination when determining the priority ranking of a command invocation. Example priority rankings include low, medium, medium-high, . . . high and/or A, B, . . . N and/or $1^{st}$, $2^{nd}$, . . . $N^{th}$ and/or the like. Any number of priority rankings may be defined as is desired.

In some examples, a highest priority (e.g., critical priority) may be defined, and command invocations identified as being critical priority may be processed differently from command invocations of any other priority. For example, the critical command invocation may be placed at the front of queue 416 such that minimal ordered positions of the queue are traversed before the critical command invocation issues into an issued command. Positioning a critical command invocation at the front of the queue causes the critical command invocation to be transformed into an issued command and transmitted quicker than non-critical commands. Further, some or all of the checks, verifications, and/or reverifications performed by a processor on non-critical command invocation after queuing of the non-critical command invocation, as is described further below, may be skipped for critical command invocations, thereby allowing the critical command invocation to issue into an issued command and transmit still quicker than any command invocation that is subjected to some or all of the checks, verifications, and/or reverifications performed by a processor on a non-critical command invocation after queuing of the non-critical command invocation.

At operation 306, one or more processors selects a position for the command invocation within the issuing order of the queue based at least on the identified priority rank of the command invocation. For example, a processor that identifies a command invocation as having a top priority rank selects a position for the top ranking command invocation that is ahead in issuing order as compared to command invocations ranked as having high, medium, low, and/or $N^{th}$ priority ranks. Further, a later in time command invocation of a higher priority may receive a higher position as compared to a command invocation that was previously queued in the queue but was assigned a comparatively lower priority rank.

In an example, a first command invocation may be ranked as having a low (e.g., 416N) priority ranking, a second command invocation may be ranked as having a high (e.g., 416A) priority ranking, and a third command invocation may be ranked as having a medium (e.g., 416B) priority ranking. In such an example, one or more processors 444 would select position 416N for the first command invocation, position 416A for the second command invocation, and position 416B for the third command invocation. The command queue may be further organized according to qualities other than priority, as is detailed below with respect to FIGS. 5 and 6. As such, the issuing order of the queue is intelligently selected, which is an improvement over traditional cloud service systems wherein queues are organized by traditional first-in-first-out techniques.

Referring back to operation 306, responsive to one or more processors 444 selecting a position for the command invocation, the method may move to operation 307. At operation 307, one or more processors 444 queue the command invocation within the queue 416 according to the selected position.

Figure 5:
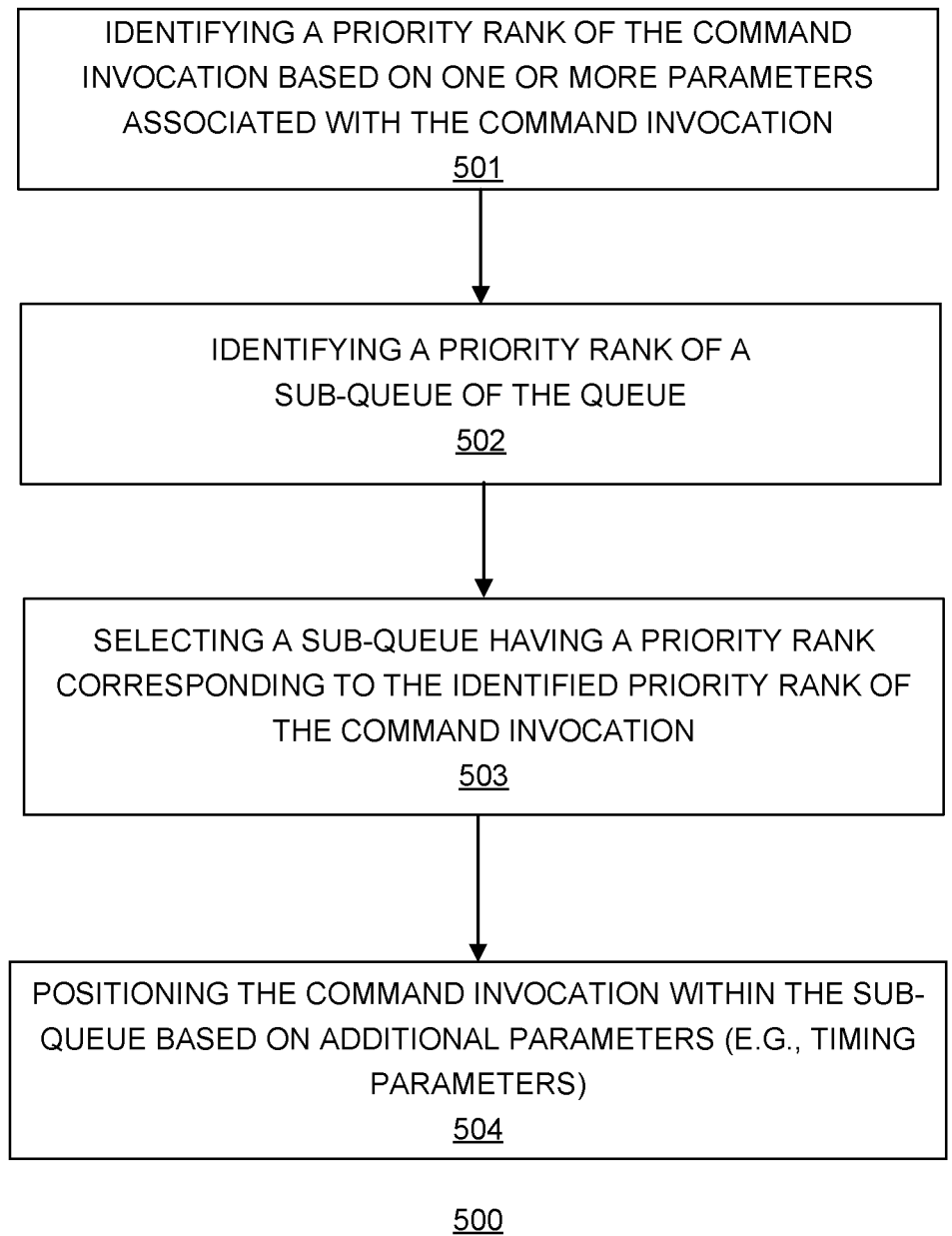
FIG. 5 is an example flow diagram illustrating an example method 500.

FIG. 5 is a flow diagram illustrating an example method 500. Various operations of example method 500 may be performed by any of the exemplary computer systems described herein. To aid in understanding, FIG. 5 is described below in conjunction with FIG. 6, which illustrates an example cloud queue 600 of a cloud environment.

Figure 6:
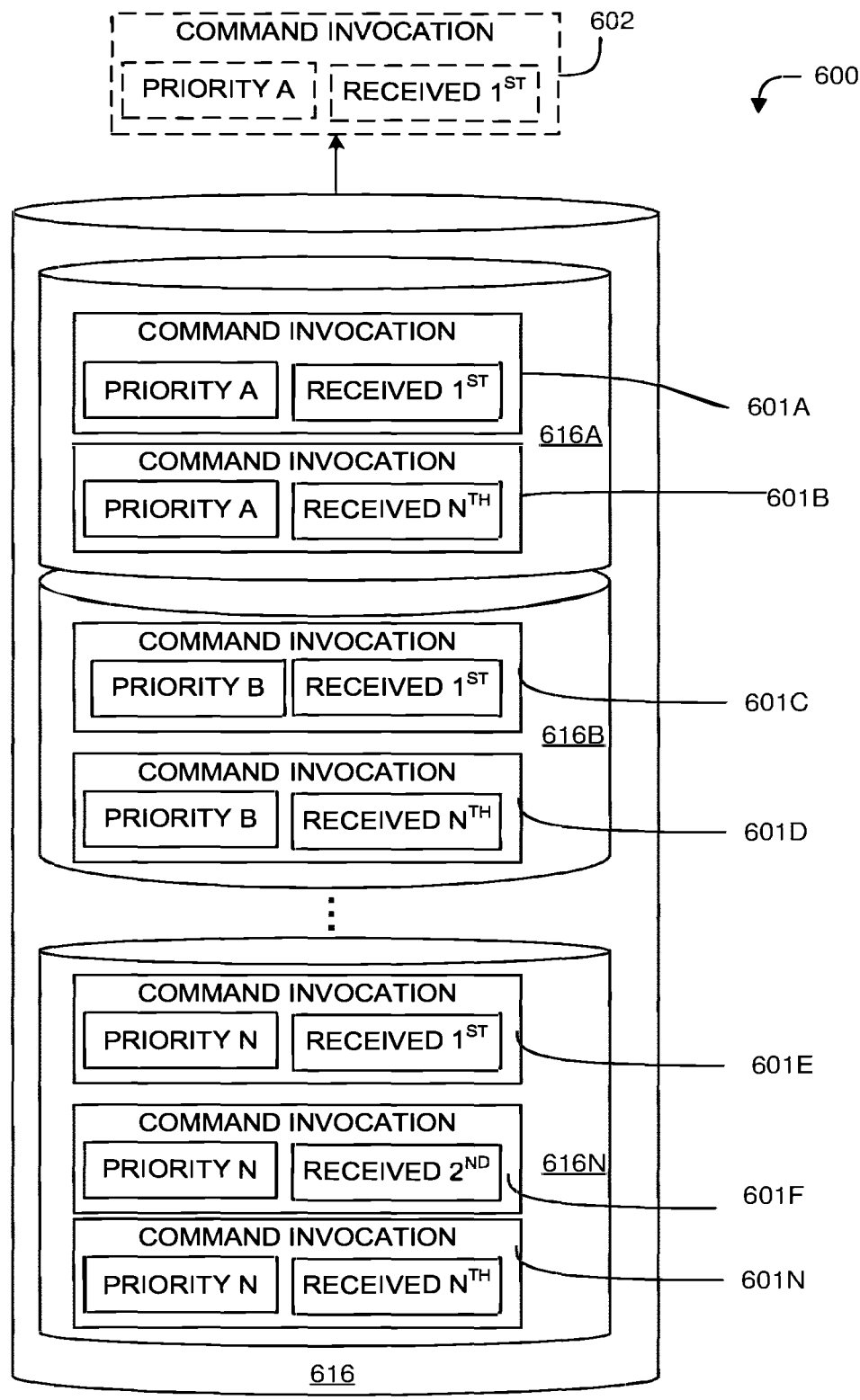
FIG. 6 illustrates an example queue 600 of a cloud environment.

Method 500 illustrates an example method of determining a position within an issuing order of queue 616 for a command invocation as well as examples of a command invocations traversing the queue 616. At operation 501, one or more processors identify a priority rank of a command invocation based on one or more parameters associated with the command invocation, as described herein. FIG. 6 illustrates examples of a plurality of command invocations 601A-601N having a various identified priorities. One or more processors identified command invocations 601E-601N as having a comparatively lowest priority (e.g., priority N), command invocations 601C-601D as having a comparatively middle/medium priority (e.g., priority B), and command invocations 601A-601B as having a comparatively highest priority (e.g., priority A).

At operation 502, one or more processors identify a priority rank of a sub-queue of the queue 616. In FIG. 6, queue 616 may include a plurality of sub-queues 616A-616N, which may be assigned various priority rankings. In an example, sub-queue 616A may be assigned to a comparatively highest priority, sub-queue 616B may be assigned to a comparatively medium priority, any number of sub-queues may be assigned comparatively lower priorities after sub-queue 616B, and sub-queue 616N may be assigned a comparatively lowest priority.

At operation 503, one or more processors select a sub-queue having a priority rank corresponding to the identified priority rank of the command invocation. For example, responsive to command invocation 601A being identified as having a highest priority and sub-queue 616A being identified as having a highest priority, one or more processors selects sub-queue 616A for command invocation 601A because the priority of sub-queue 616A corresponds to the priority of command invocation 601A. Likewise, in examples, the one or more processors select sub-queue 616A for command invocation 601B, select sub-queue 616B for command invocations 601C and 601D, and select sub-queue 616N for command invocations 601E-601N based on the respective command invocations having a corresponding priority as the respective sub-queues.

At operation 504, one or more processors position the command invocation within the selected sub-queue based on additional parameters (e.g., timing parameters). In examples, a plurality of command invocations of equivalent priority may be organized among each other according to additional parameters, which may be timing parameters and/or any parameters described herein. The additional parameters may be secondary to priority ranking such that command invocations are first ordered according to priority rank, and then command invocations of equivalent priority rank are further organized by the additional parameters. In instances, the additional parameters may be timing parameters. In examples, timing parameters may consider when the one or more processors requested the command invocation, when the set of conditions corresponding to the constraints were satisfied, and/or when the invocation command is queued (e.g., first-in-first-out).

In examples of FIG. 6, sub-queue 616A is selected as corresponding with command invocations 601A and 601B, and operation 504 positions command invocations 601A and 601B within sub-queue 616A based on additional parameters, e.g., timing parameters. For instance, one or more processors may determine that command invocation 601A was requested (e.g., operation 302) prior in time than command invocation 601B. Based on the determination made with respect to the additional parameters, one or more processors position command invocation 601A higher in sub-queue 616A than command invocation 601B. A command invocation that is positioned higher in a sub-queue (e.g., sub-queues 616A, 616B, or 616N) is positioned closer to the front of the overall queue 616 than a command invocation that is positioned lower in the same respective sub-queue. A command invocation positioned at the front most position of the queue may be disposed of (e.g., command invocation 602) such that the subsequent command invocations may traverse forward.

Responsive to command invocation 601A exiting queue 616, command invocation 602A traverses forward in position toward the front of queue 616 and is now in position to exit the queue 616. As command invocation 601A traverses forward in position toward the front of queue 616, the command invocations positioned behind command invocations 601A (e.g., command invocations 601B-601N), likewise traverse forward in position advancing closer to the front of the queue.

In examples, traditional problems caused by conventional network congestion, processing overload at server side devices and user side devices, transmission latency and long queue length may be further improved by evaluating factors responsive to a command invocation reaching the front most position of the queue but prior to issuing and transmitting, and/or otherwise disposing of the front most command invocation. Method 700 of FIG. 7 describe examples of realizing these improvements.

Figure 7:
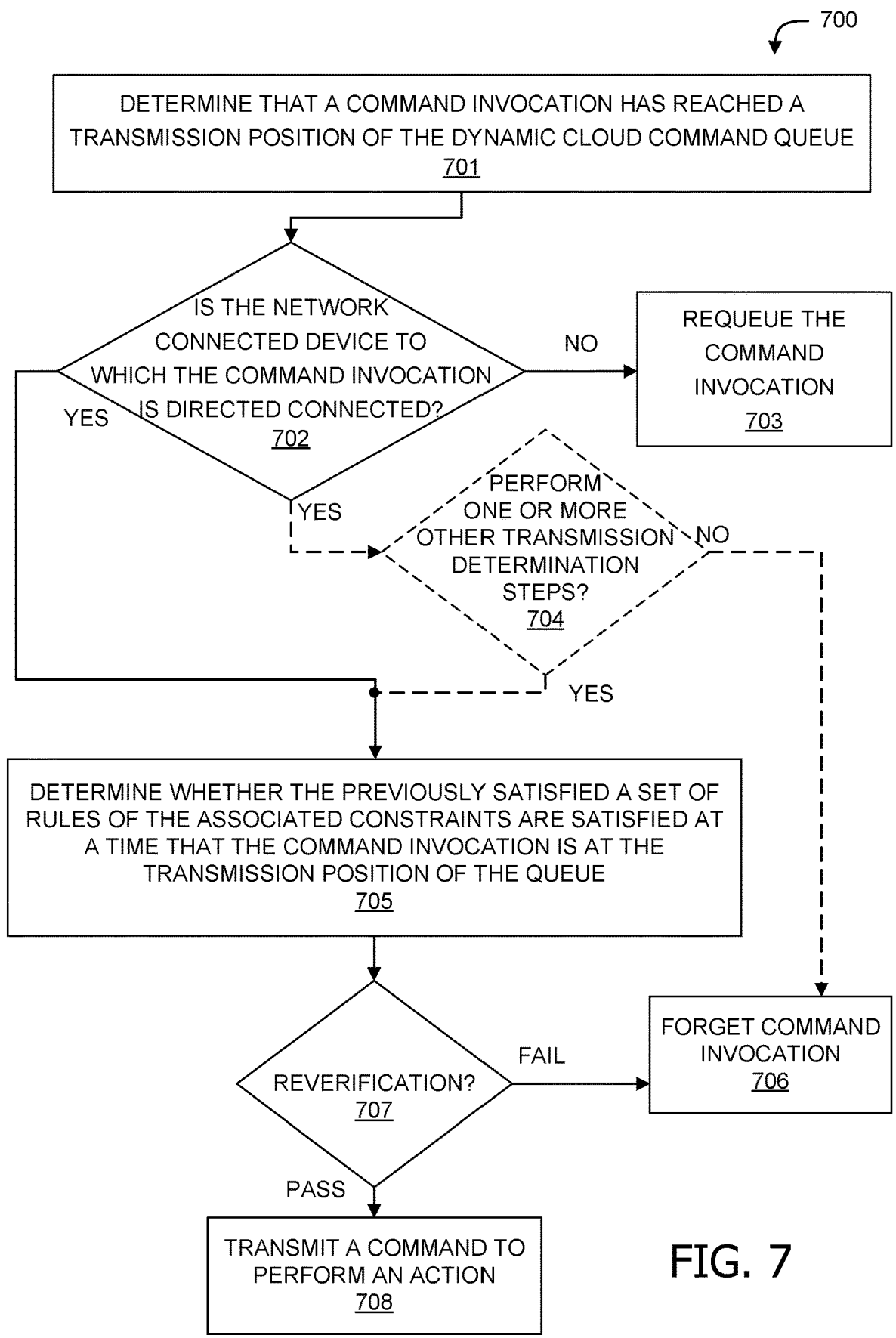
FIG. 7 is an example flow diagram illustrating an example method 700.

FIG. 7 is a flow diagram illustrating an example method 700. Method 700 describes example operations performed by systems disclosed herein responsive to a command invocation reaching the front of a queue (e.g. queue 616) such that the command invocation is disposed from the front most position of the queue and subsequent command invocations traverse towards the front most position of the queue in accordance with their respective issuing order.

In examples, one or more processors performing operations of method 700 evaluate various factors to determine how to dispose of a front most command invocation. Example disposals include, but are not limited to, issuing a command invocation into an issued command and packaging the issued command into a transmitted command that is transmitted to and is received by one or more network connected devices, re-queuing a command invocation, and forgetting and/or deleting a command invocation. In examples, the front most position of the queue may be referred to as a transmission position of the queue because at the front position of the queue, one or more processors determine whether or not to cause the command of the command invocation to be transmitted to one or more network connected devices.

At operation 701, one or more processors determine that a command invocation has reached a transmission position of a queue (e.g., a dynamic cloud command queue). For instance, comparing command invocation 601A to command invocations 601B-601N, which are positioned lower in queue 616, command invocation 601A traverses less positions before reaching the front of queue 616, and therefore reaches a transmission position of queue 616 more quickly than command invocations 601B-601N.

At operation 702, one or more processors determine whether to transmit command invocation 601A based on a first set of one or more factors (e.g., connectivity). At operation 702, one or more processors may identify one or more network connected devices to which the command invocation is directed. Further, one or more processes determine whether some or all of the one or more network devices of the command invocation are presently connected to the cloud network at that time. Responsive to one or more processors determining that some or all of the network connected devices lack connectively with the cloud network at that time, one or more processors at operation 703 may cause the command invocation to be requeued in the queue.

Traditional systems that transmit a message to one or more network connected devices that lack network connectivity and may never receive the message, waste processing capacity as well as cause unnecessary network congestion. Systems and methods disclosed herein improve conventional technology by requeuing the command invocation thereby avoiding wasted processing and network congestion while maintaining the command invocation within the queue for attempted transmission at another time (e.g., at a time that network connected devices are connected). When requeuing an invocation command, one or more processors at operation 703 may perform some or all operations of example method 300 and/or 500. Further, when requeuing an invocation command, one or more processors at operation 703 may simply place the invocation command at the back of the queue, which may give one or more network connected devices additional time to achieve connectivity.

In some instances, if a critical command is re-queued for any reason (e.g., according to operation 703), cloud solution service 113 may generate an alert. The alert may be sent to an operator of cloud solution service 113 and/or a user of a network connected device, one or more both of which may take actions to resolve any issues as is appropriate. As mentioned above, some or all of the verifications and/or reverifications may be skipped when a critical command invocation reaches a transmission position. For example, a critical command may issue and be transmitted without determining device connectivity (e.g., operation 702 may be skipped). Because critical command invocations traverse the queue so quickly, latency between the time a critical command invocation is approved for queuing and the time the critical command invocation reaches the transmission position is of less concern for such commands.

Responsive to one or more processors determining that some or all of the network connected devices are connected to the cloud network at that time, the method may optionally move to operation 704. At optional operation 704, one or more processors may perform one or more other transmission determination operations. For example, one or more processors may determine whether the set of conditions that were present at the time the command invocation was requested (e.g., operation 302) are still present. If the conditions are no longer present, the command invocation may be considered stale and transmission thereof unwarranted. If the conditions still exist, then transmission of the command invocation might still be desirable. If at operation 704, one or more processors determines that the command invocation should not be transmitted, then one or more processors may forget the command invocation at operation 706, which is detailed further below. If at operation 704, one or more processors determines that the command invocation might still be warranted, then the method may move to operation 705.

At operation 705, one or more processors determines whether the previously satisfied set of rules of the corresponding constraints (e.g., from operation 303) are satisfied at the time operation 704 is performed. As explained above, traditional cloud services queues often grow undesirably long, causing conventional systems to issue inappropriate commands because commands are often trapped in the queue for such a long time that circumstances changed, and the command is no longer appropriate at the time of transmission. By re-verifying whether the previously satisfied set of rules of the corresponding constraints are satisfied at the time of potential transmission, the above shortcomings of traditional cloud services are overcome.

If at operation 707, reverification fails, then one or more processors cause the queue to forget the command invocation. The command invocation may be deleted, removed from the queue without being passed to issuance, and/or otherwise disposed of in a way that avoids re-queuing, issuance, or transmission of the command invocation. By forgetting command invocations that are no longer appropriate, systems and methods herein ensure that cloud issued commands satisfy network connected devices' constraints even if some command invocations are in the queue for long periods of time.

If at operation 705707, reverification is passed, then at operation 708, one or more processors transmits a command to one or more network connected devices.

Figure 8:
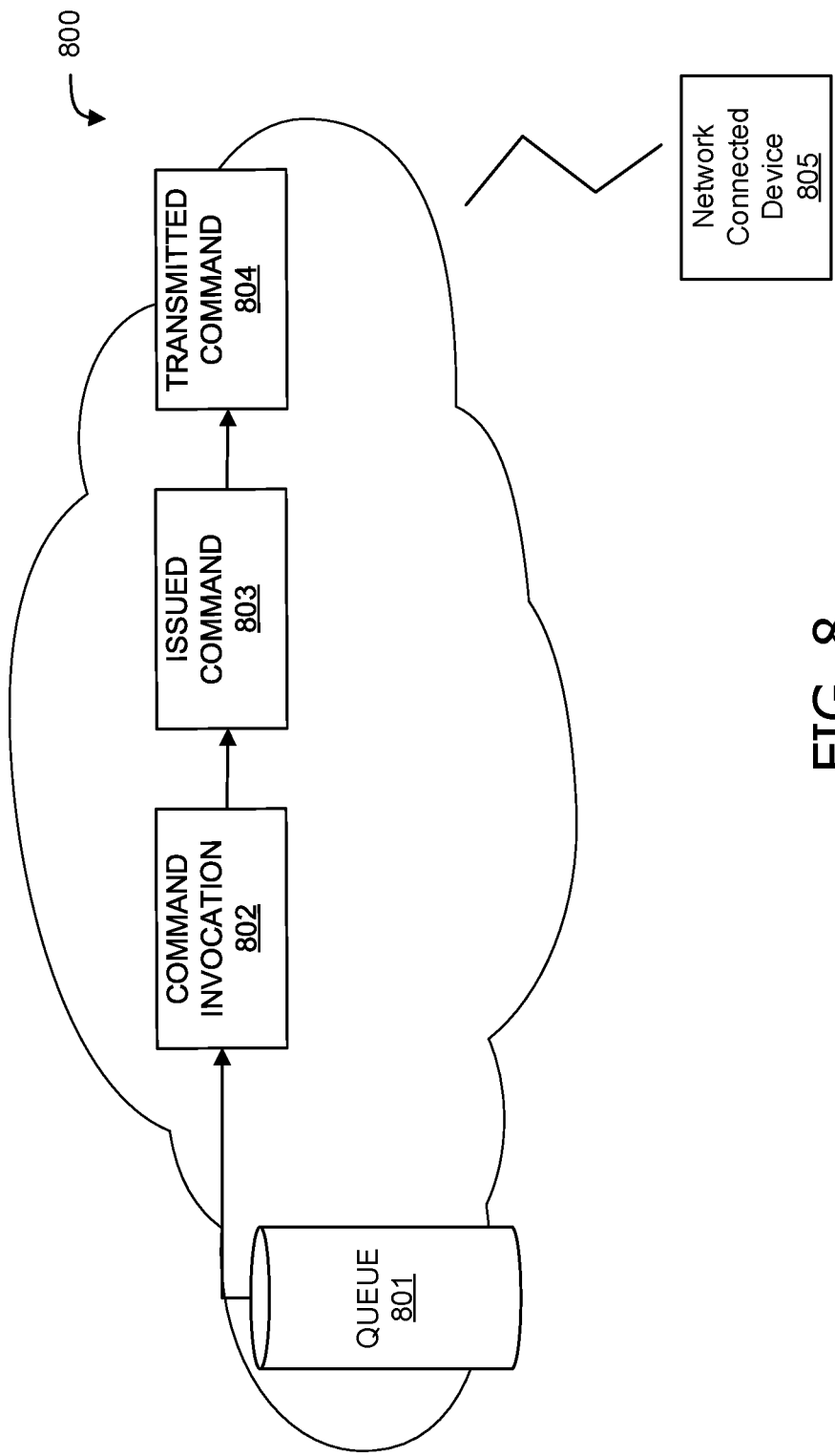
FIG. 8 illustrates an example cloud queue 800 of a cloud environment.

FIG. 8 illustrates an example of operation 708, wherein one or more processors remove the command invocation 802 from the queue 801 and transforms the command invocation 802 into an issued command 803. The one or more processors package the issued command 803 into a transmitted command 804 that is transmitted to and received by the one or more network connected devices 805 to which it was directed. Upon a network connected device 805 receiving a transmitted command 804, the network connected device 805 executes device code of the transmitted command 804, which causes one or more processors of the network connected device 805 to perform an action (e.g., causes a camera to record).

Figure 9:
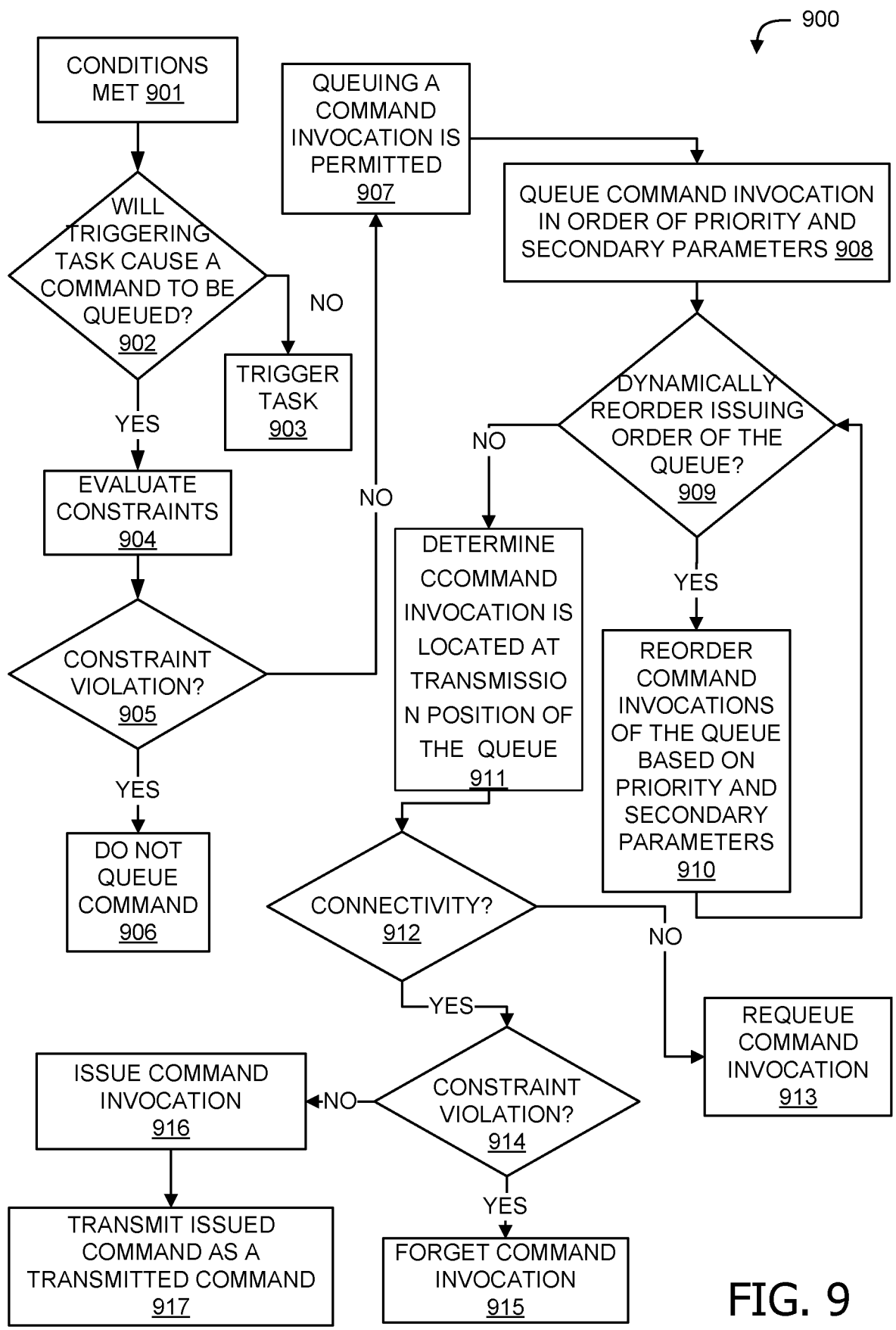
FIG. 9 is an example flow diagram illustrating an example method 900.

FIG. 9 is a flow diagram illustrating an example method 900 operating on one or more computer systems described herein. At operation 901, one or more processors determine that one or more conditions of a software service 120 is met such that a task may be triggered for one or more network connected devices 105A-105N. At operation 902, one or more processors determine whether triggering the task will cause a command invocation to be queued for transmission to network connected device 105. If triggering the task causes no command invocation to be queued for transmission to network connected device 105, then the method moves to operation 903 where the task is triggered. If triggering the task would involve queuing a command invocation for transmission to network connected device 105, then the method moves to operation 904. During operation 904, one or more processors evaluate constraints of software model interface 140 that corresponds to network connected device 105. At operation 905, one or more processors validate the potential command against the evaluated constraints to determine whether transmitting the potential command invocation would violate any constraints and/or satisfy all constraints. If at operation 905 one or more processors determine that a constraint test would be failed, then the method moves to operation 906 and one or more processors do not queue the command invocation. In examples, the non-queued command invocation may be delayed and considered for queuing at a later time. In examples, the non-queued command invocation may simply be deleted, canceled, or otherwise forgotten.

If at operation 905 one or more processors determines that the potential command invocation passes the constraint test, then the method moves to operation 907 wherein one or more processors determine that queuing the command invocation is to be permitted. Method 900 moves to operation 908, wherein one or more processors determine where, within the issuing order of the queue, to place the command. During operation 908, one or more processors evaluate one or more parameters to determine a priority ranking of the command invocation and secondary parameters (e.g., timing parameters) to select a position within the issuing order of the queue to place the command invocation.

At operation 909, one or more processors determines whether the issuing order of the queue will be reordered. In example, the queue (e.g., dynamic cloud command queue) may be dynamically evaluated such that the issuing order of the queue may be changed at any time. For example, command invocations within the queue maybe reordered, de-prioritized, re-prioritized, and/or forgotten responsive to the triggering of an event, for example, periodically, based on queue length, based on a threshold of commands determined to be stale, based on information pushed from one or more network connected devices, based on any other examples provides herein, and/or any combination thereof. In examples, one or more processors may determine that command invocations within one or more sub-queues will be evaluated for reordering and/or reordered while other of the sub-queues are not.

If at operation 909, one or more processors determine that evaluation of the queue is warranted, method 900 moves to operation 910, and one or more processors revaluates one or more command invocations of the queue, reprioritizes some or all the command invocations, and reorders the issuing order of some or all the command invocations within the queue and/or sub-queues of the queue.

If at operation 909, one or more processors determine that dynamic evaluation of the queue will not occur at this point, then at operation 911, one or more processors determine that a command invocation has reached the transmission location of the queue. Responsive to operation 911, at operation 912, one or more processors determine whether one or more of the network connected devices of the command invocation are presently connected to the cloud network. If not, then at operation 913, one or more processors requeues the command invocation. If one or more of the network connected devices satisfy the connectivity test, then method 900 may move to operation 914 for the one or more network connected devices. In some examples, some of the one or more network connected devices of the command invocation may be determined to be connected while others are not. In some examples, one or more processors may split the command invocation such that the command invocation is requeued for the one or more network connected devices lacking connectivity at that time, while the command invocation is advanced to operation 914 for the one or more network connected devices having connectivity at that time. In some examples, one or more processors may not split the command invocation and decide to requeue the command invocation for all the network connected devices of the command invocation.

At operation 914, one or more processors determines whether the command invocation violates constraints of the one or more network connected devices at that time. If not, then at operation 915, one or more processors issues the command invocation, and at operation 916, one or more processors transmits the issued command as a transmitted command to the one or more network connected devices.

If at operation 914, one or more processors determine that one or more of the network connected devices violate the constraints, then method 900 may move to operation 915 for the one or more network connected devices. At operation 915, one or more processors forget the command invocation. In some examples, some of the one or more network connected devices of the command invocation may be determined to violate the constraints while others are not. In some examples, one or more processors may split the command invocation such that the command invocation is forgotten for the one or more network connected devices violating the constraints at that time, while the command invocation is advanced to operation 915 for the one or more network connected devices satisfying the rules of the constraints at that time. In some examples, one or more processors may not split the command invocation and decide to forget the command invocation for all the network connected devices of the command invocation. After disposing the command invocation from the transmission position of the queue, the next command invocation advances to the transmission position of the queue, and the one or more processor determines how to dispose of the next command invocation.

Example systems and methods herein improve traditional queuing operations by proving queuing logic that is not just first come first serve. Rather, the example queuing may be based on addition information providing smarter queuing as compared to traditional methods. Further, examples herein provide dynamic queuing which provides for the order of queued commands to change after an initial queue position is established, for example, to respond to changed conditions. Further, examples herein providing for more fine-grained control over command conditions in a deterministic fashion. Further still, examples herein check if conditions initially met are still valid and provide for bucketing of commands into priority sub-queues within a larger queue which further improves over traditional methods. These improvements provide for intelligently manage command queues that automatically issue commands as are appropriate. Optimization is achieved in cloud resourcing and the burden of devices (and device manufacturers) is significantly reduced.

Example Operating Environment

Figure 10:
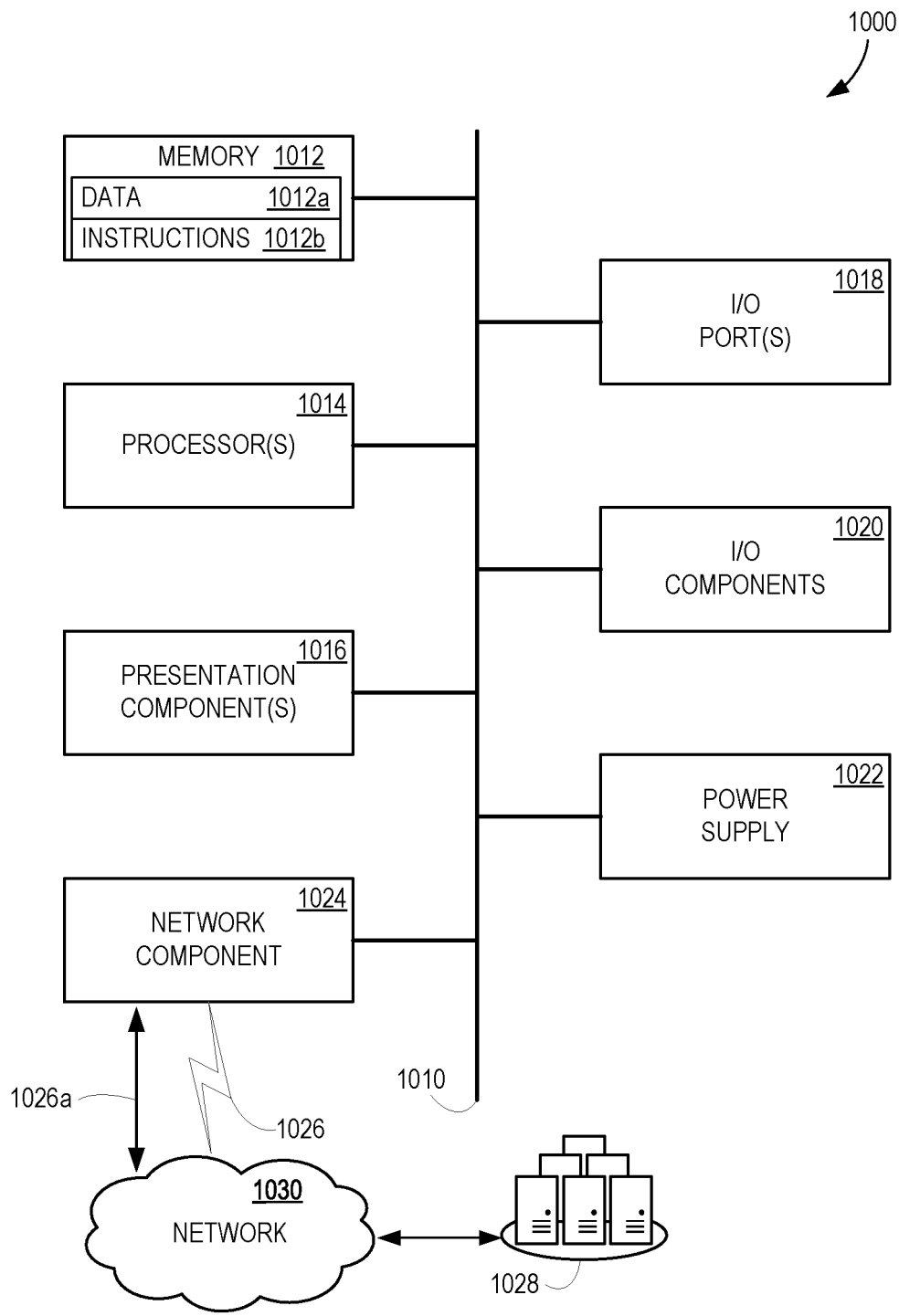
FIG. 10 is an example block diagram illustrating an example computing environment suitable for implementing some of the various examples disclosed herein.

FIG. 10 is a block diagram of an example computing device 1000 for implementing aspects disclosed herein and is designated generally as computing device 1000. Computing device 1000 is an example of a suitable computing environment and is not intended to suggest any limitation as to the scope of use or functionality of the examples disclosed herein. Neither should computing device 1000 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 1000 includes a bus 1010 that directly or indirectly couples the following devices: computer-storage memory 1012, one or more processors 1014, one or more presentation components 1016, I/O ports 1018, I/O components 1020, a power supply 1022, and a network component 1024. While computing device 1000 is depicted as a seemingly single device, multiple computing devices 1000 may work together and share the depicted device resources. For example, memory 1012 may be distributed across multiple devices, and processor(s) 1014 may be housed with different devices.

Bus 1010 represents what may be one or more busses (such as an address bus, data bus, or a combination thereof). Although the various blocks of FIG. 10 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 10 and the references herein to a "computing device." Memory 1012 may take the form of the computer-storage media references below and operatively provide storage of computer-readable instructions, data structures, program modules and other data for computing device 1000. In some examples, memory 1012 stores one or more of an operating system, a universal application platform, or other program modules and program data. Memory 1012 is thus able to store and access data 1012a and instructions 1012b that are executable by processor 1014 and configured to carry out the various operations disclosed herein.

In some examples, memory 1012 includes computer-storage media in the form of volatile and/or non-volatile memory, removable or non-removable memory, data disks in virtual environments, or a combination thereof. Memory 1012 may include any quantity of memory associated with or accessible by computing device 1000. Memory 1012 may be internal to computing device 1000 (as shown in FIG. 10), external to computing device 1000 (not shown), or both (not shown). Examples of memory 1012 in include, without limitation, random access memory (RAM); read only memory (ROM); electronically erasable programmable read only memory (EEPROM); flash memory or other memory technologies; CD-ROM, digital versatile disks (DVDs) or other optical or holographic media; magnetic cassettes, magnetic tape, magnetic disk storage or other magnetic storage devices; memory wired into an analog computing device; or any other medium for encoding desired information and for access by computing device 1000. Additionally, or alternatively, memory 1012 may be distributed across multiple computing devices 1000, for example, in a virtualized environment in which instruction processing is carried out on multiple computing devices 1000. For the purposes of this disclosure, "computer storage media," "computer-storage memory," "memory," and "memory devices" are synonymous terms for computer-storage memory 1012, and none of these terms include carrier waves or propagating signaling.

Processor(s) 1014 may include any quantity of processing units that read data from various entities, such as memory 1012 or I/O components 1020 and may include CPUs and/or GPUs. Specifically, processor(s) 1014 are programmed to execute computer-executable instructions for implementing aspects of the disclosure. The instructions may be performed by the processor, by multiple processors within computing device 1000, or by a processor external to client computing device 1000. In some examples, processor(s) 1014 are programmed to execute instructions such as those illustrated in the in the accompanying drawings. Moreover, in some examples, processor(s) 1014 represent an implementation of analog techniques to perform the operations described herein. For example, the operations may be performed by an analog client computing device 1000 and/or a digital client computing device 1000. Presentation component(s) 1016 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 1000, across a wired connection, or in other ways. I/O ports 1018 allow computing device 1000 to be logically coupled to other devices including I/O components 1020, some of which may be built in. Example I/O components 1020 include, for example but without limitation, a microphone, joystick, game pad, satellite dish, scanner, printer, wireless device, etc.

Computing device 1000 may operate in a networked environment via network component 1024 using logical connections to one or more remote computers. In some examples, network component 1024 includes a network interface card and/or computer-executable instructions (e.g., a driver) for operating the network interface card. Communication between computing device 1000 and other devices may occur using any protocol or mechanism over any wired or wireless connection. In some examples, network component 1024 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 1024 communicates over wireless communication link 1026 and/or a wired communication link 1026a to a cloud resource 1028 across network 1030. Various different examples of communication links 1026 and 1026a include a wireless connection, a wired connection, and/or a dedicated link, and in some examples, at least a portion is routed through the internet.

Although described in connection with an example computing device 1100, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality (MR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and non-volatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media typically embody computer readable instructions, data structures, program modules, or the like in a modulated data signal such as a carrier wave or other transport mechanism and include any information delivery media.

Example methods of operating a cloud computing environment include monitoring, by one or more cloud computing processors, conditions associated with at least one network connected device; and responsive to the monitoring, requesting a command invocation associated with the at least one network connect devices be queued. Further, responsive to the requesting, exemplary methods verify a set of rules associated with constraints of the at least one network connected device is satisfied; and responsive to the verification, determine that the command invocation is to be queued in a cloud queue that defines a dynamic issuing order of a plurality of command invocations associated with a plurality of network connected devices. Further still, example methods identify a priority rank of the command invocation based on one or more parameters associated with the command invocation and select a position for the command invocation within the dynamic issuing order based at least on the identified priority rank of the command invocation. Moreover, example methods queue the command invocation within the cloud queue according to the selected position.

Example systems of a cloud computing environment include one or more cloud gateways operable to receive communications from one or more network connected devices and at least one cloud queue that defines a dynamic transmission order of a plurality of command invocations addressed to a plurality of remote devices. Exemplary systems further include one or more cloud memories accessible by one or more processors that monitor the one or more network connected devices based at least on information obtained from the one or more cloud gateways responsive to the received communications, wherein the one or more processors also verify, based at least on the obtained information, satisfaction of a set of rules associated with at least one network connected device, of the one or more network connected devices. In examples, the one or more processors, responsive to the verified satisfaction, also determine that a command invocation addressed to the at least one network connected device is to be queued in the cloud queue and identify a priority rank of the command invocation based on one or more parameters associated with the command invocation. Yet further, the exemplary one or more processors select a position for the command invocation within the cloud queue based at least on the identified priority rank of the command invocation while the example cloud queue queues the command invocation with the plurality of command invocations according to the selected position.

Exemplary computer storage devices having computer-executable instructions stored thereon for dynamic queuing within a cloud computing environment, which, on execution by a computer, cause the computer to perform operations including monitoring conditions associated with at least one network connected device; and responsive to the monitoring, requesting a command invocation associated with the at least one network connect devices be queued. In examples, responsive to the requesting, additional operations include verifying a set of rules associated with constraints of the at least one network connected device is satisfied. Further, responsive to the verification, instances also perform determining that the command invocation is to be queued in a cloud queue that defines a dynamic issuing order of a plurality of command invocations associated with a plurality of network connected devices and identifying a priority rank of the command invocation based on one or more parameters associated with the command invocation. Moreover, in examples, additional operations include selecting a position for the command invocation within the dynamic issuing order based at least on the identified priority rank of the command invocation and queuing the command invocation within the cloud queue according to the selected position.

Alternatively, or in addition to the other examples described herein, examples include any combination of the following:

wherein responsive to a trigger, requeuing the command invocation according to a new selected position within the cloud queue;

wherein the trigger is a determination that the at least one network connected device lacks cloud connectivity at a time the command invocation is at a transmission position;

wherein the trigger includes at least another queuing of another command invocation having a priority rank that is higher than the priority rank of the command invocation;

wherein determining that the command invocation has reached a transmission position of the cloud queue; and prior to transmitting the command invocation to the least one network connected device, determining connectivity of the at least one network connected device;

determining that the command invocation has reached a transmission position of the cloud queue; responsive to the determined transmission position, determining that issuance of the command invocation, at a time that the command invocation is at the transmission position, violates the set of rules associated with constraints of the at least one network connected device; and responsive to the determined violation, performing one of: requeuing the command invocation and forgetting the command invocation;

wherein determining that the command invocation has reached a transmission position of the cloud queue; responsive to the determined transmission position, reverifying that set of rules associated with constraints of the at least one network connected device are satisfied at a time that the command invocation is at the transmission position; and responsive to the reverification, transmitting, to the at least one network connected device, a command to perform an action;

wherein the selection of a position of the command invocation within the cloud queue is further based on a time at which the verification of the set of rules occurred;

wherein the cloud queue comprises a plurality of sub-queues ranked according to priority, wherein the position selected for the command invocation is a sub-queue of the plurality of sub-queues that is ranked according to a priority corresponding with the identified priority rank of the command invocation, and wherein the position the within the sub-queue is determined based at least on a time at which the verified satisfaction of the set of rules occurred;

wherein responsive to the identified priority rank of the command invocation being critical, the critical command invocation is queued in a transmission position, and wherein transmitting, to the at least one network connected device, a command to perform an action irrespective of connectivity;

wherein responsive to a trigger, the one or more processors select a new position for the command invocation, and the cloud queue requeues the command invocation at the selected new position;

wherein responsive to the command invocation being located at a transmission position of the cloud queue, the one or more processors determine the at least one network connected device is communicatively connected to the cloud computing environment, and wherein responsive to the determined communication connectivity, the command invocation issues into an issued command that is packaged into a transmitted command;

wherein at least one transmitter transmits a plurality of transmitted commands that originated from the cloud queue, wherein responsive to the command invocation being located at a transmission position of the cloud queue, the one or more processors reverify satisfaction of set of rules at a time that the command invocation is at the transmission position of the cloud queue, and wherein responsive to the reverification, the command invocation issues from the cloud queue and is packaged into a transmitted command that the transmitter transmits to the at least one network connected device.

wherein the cloud queue comprises a plurality of sub-queues ranked according to priority, wherein the position selected for the command invocation is a sub-queue of the plurality of sub-queues that is ranked according to a priority corresponding with the identified priority rank of the command invocation, and wherein the position the within the sub-queue is determined based at least on a time at which the verified satisfaction of the set of rules occurred;

wherein responsive to a trigger, requeuing the command invocation and at least another command invocation of the plurality of command invocations according at least to a new selected position of the command invocation and a new selection position of the other command invocation within the cloud queue;

wherein responsive to the command invocation reaching a transmission position of the cloud queue, determining that the set of rules associated with the constraints of the at least one network connected device is unsatisfied, at a time that the command invocation is at the transmission position of the cloud queue; responsive to the determined unsatisfaction, causing the command invocation to be forgotten; responsive to another command invocation reaching the transmission position of the cloud queue, reverifying that a set of rules, associated with the other command invocation that was previously satisfied, is satisfied at a time the other command invocation is at the transmission position of the cloud queue; and responsive to the reverified satisfaction, causing a command of the other command invocation to be transmitted to the at least one network connected device.

The order of execution or performance of the operations in examples of the disclosure illustrated and described herein is not essential and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

It will be appreciated that the above embodiments have been described by way of example only. Other applications or variants of the disclosed techniques may become apparent to a person skilled in the art given the disclosure herein. The scope of the present disclosure is not limited by the above-described embodiments but only by the accompanying claims.

The invention claimed is:

1. A computer-implemented method, comprising:
  receiving, by a computing processor of a computing system, a command invocation associated with a network connected device that is connected to the computing system via a wireless network, the network connected device being remote to the computing system, wherein the computing system shares control of data storage, collection, or processing responsibilities with the network connected device;
  verifying, by the computing processor, a set of rules associated with constraints of the network connected device is satisfied;
  responsive to the verification, determining that the command invocation is to be queued in a cloud queue;
  queuing the command invocation within a dynamic issuing order of the cloud queue according to a priority rank of the command invocation, wherein issuance of the command invocation from the cloud queue causes the command invocation to be transmitted to the network connected device via the wireless network, and wherein the command invocation prompts the network connected device to execute a task relating to the shared data storage, collection, or processing responsibilities responsive to receiving the command invocation via the wireless network; and
  responsive to the command invocation reaching a transmission position of the cloud queue:
    determining that the set of rules associated with the constraints of the network connected device is no longer satisfied, and
    discarding the command invocation without issuing the command invocation from the cloud queue in response to determining that the set of rules associated with the constraints of the network connected device is no longer satisfied.

2. The computer-implemented method of claim 1, further comprising:
  monitoring conditions associated with the network connected device; and
  requesting the command invocation responsive to one of the monitored conditions triggering a task.

3. The computer-implemented method of claim 1, further comprising:
  identifying the priority rank of the command invocation based on a parameter associated with the command invocation.

4. The computer-implemented method of claim 1, wherein the command invocation is a first command invocation and the set of rules is a first set of rules, and wherein the method further comprises, responsive to a second command invocation reaching the transmission position of the cloud queue:
  reverifying that a second set of rules associated with the second command invocation is satisfied at a time the second command invocation is at the transmission position of the cloud queue, wherein the second set of rules have been previously been satisfied, and
  responsive to the reverification, causing a command of the second command invocation to be transmitted to the network connected device.

5. The computer-implemented method of claim 1, wherein the command invocation is a first command invocation and the set of rules is a first set of rules, and wherein the method further comprises, responsive to a second command invocation reaching the transmission position of the cloud queue:
  reverifying that a second set of rules associated with the second command invocation is satisfied at a time the second command invocation is at the transmission position of the cloud queue, the second set of rules having previously been satisfied, and
  responsive to failing to reverify that the set of rules is satisfied at the time the second command invocation is at the transmission position of the cloud queue, causing the command invocation to be forgotten.

6. The computer-implemented method of claim 1, wherein causing the command invocation to be forgotten comprises:
  deleting the command invocation or removing the command invocation from the cloud queue without being passed to issuance.

7. The computer-implemented method of claim 1, further comprising, responsive to the command invocation reaching the transmission position of the cloud queue:
  reverifying the network connected device is connected.

8. The computer-implemented method of claim 7, further comprising:
  responsive to reverifying the network connected device is not connected, re-queuing the command invocation; and
  generating an alert indicating the command invocation is re-queued.

9. The computer-implemented method of claim 7, further comprising:
  responsive to reverifying the network connected device is connected, reverifying the set of rules associated with the constraints of the network connected device is satisfied.

10. The computer-implemented method of claim 9, further comprising:
  responsive to reverifying the set of rules associated with the constraints of the network connected device is satisfied, transmitting the command invocation.

11. One or more computer storage media having computer-executable instructions stored thereon, which, on execution by a computer, cause the computer to perform operations comprising:
  receiving, by a computing processor of a computing system, a command invocation associated with a network connected device that is connected to the computing system via a wireless network, the network connected device being remote to the computing system, wherein the computing system shares control of data storage, collection, or processing responsibilities with the network connected device;
  verifying, by the computing processor, a set of rules associated with constraints of the network connected device is satisfied;
  determining that the command invocation is to be queued in a cloud queue;
  queuing the command invocation within a dynamic issuing order of the cloud queue according to a priority rank of the command invocation, wherein issuance of the command invocation from the cloud queue causes the command invocation to be transmitted to the network connected device via the wireless network, and wherein the command invocation prompts the network connected device to execute a task relating to the shared data storage, collection, or processing responsibilities responsive to receiving the command invocation via the wireless network; and responsive to the command invocation reaching a transmission position of the cloud queue:
- determining that the set of rules associated with the constraints of the network connected device is no longer satisfied, and
- discarding the command invocation without issuing the command invocation from the cloud queue in response to determining that the set of rules associated with the constraints of the network connected device is no longer satisfied.

12. The one or more computer storage media of claim 11, wherein the operations further comprise:
identifying the priority rank of the command invocation based on a parameter associated with the command invocation.

13. The one or more computer storage media of claim 11, wherein the command invocation is a first command invocation and the set of rules is a first set of rules, and wherein, responsive to a second command invocation reaching the transmission position of the cloud queue, the operations further comprise:
- reverifying that a second set of rules associated with the second command invocation is satisfied at a time the second command invocation is at the transmission position of the cloud queue, wherein the second set of rules have been previously been satisfied, and
- responsive to the reverification, causing a command of the second command invocation to be transmitted to the network connected device.

14. The one or more computer storage media of claim 13, wherein the operations further comprise:
responsive to failing to reverify that the set of rules are satisfied at the time the second command invocation is at the transmission position of the cloud queue, causing the command invocation to be forgotten.

15. The one or more computer storage media of claim 11, wherein, to cause the command invocation to be forgotten, the operations further comprise:
- responsive to a trigger event, reordering the dynamic issuing order of the cloud queue,
- wherein the trigger event is at least one a length of the cloud queue, a threshold of command in the cloud queue being determined to be stale, and received information from the network connected device.

16. The one or more computer storage media of claim 11, wherein the computer further performs operations comprising:
responsive to the command invocation reaching the transmission position of the cloud queue, reverifying the network connected device is connected.

17. The one or more computer storage media of claim 16, wherein the operations further comprise:
- responsive to determining the network connected device is not connected, re-queuing the command invocation; and
- responsive to re-queuing the command invocation, generating an alert indicating the command invocation is re-queued.

18. The one or more computer storage media of claim 16, wherein the operations further comprise:

responsive to determining the network connected device is connected, reverifying the set of rules associated with the constraints of the network connected device is satisfied; and responsive to reverifying the set of rules associated with the constraints of the network connected device is satisfied, transmitting a command of the command invocation to be transmitted.

19. A computing system comprising:
a processor;
computer storage media having computer-executable instructions stored thereon, which, upon execution by the processor, cause the processor to perform operations comprising:
receiving, by a computing processor of a computing system, a command invocation associated with a network connected device that is connected to the computing system via a wireless network, the network connected device being remote to the computing system, wherein the computing system shares control of data storage, collection, or processing responsibilities with the network connected device;
verifying, by the computing processor, a set of rules associated with constraints of the network connected device is satisfied;
determining that the command invocation is to be queued in a cloud queue;
queuing the command invocation within a dynamic issuing order of the cloud queue according to a priority rank of the command invocation, wherein issuance of the command invocation from the cloud queue causes the command invocation to be transmitted to the network connected device via the wireless network, and wherein the command invocation prompts the network connected device to execute a task relating to the shared data storage, collection, or processing responsibilities responsive to receiving the command invocation via the wireless network; and
responsive to the command invocation reaching a transmission position of the cloud queue:
- determining that the set of rules associated with the constraints of the network connected device is no longer satisfied, and
- discarding the command invocation without issuing the command invocation from the cloud queue in response to determining that the set of rules associated with the constraints of the network connected device is no longer satisfied.

20. The computing system of claim 19, wherein the operations further comprise:
identifying the priority rank of the command invocation based on a parameter associated with the command invocation.

21. The computing system of claim 19, wherein the command invocation is a first command invocation and the set of rules is a first set of rules, and wherein, responsive to a second command invocation reaching the transmission position of the cloud queue, the operations further comprise:
- reverifying that a second set of rules associated with the second command invocation is satisfied at a time the second command invocation is at the transmission position of the cloud queue, wherein the second set of rules have been previously been satisfied, and
- responsive to the reverification, causing a command of the second command invocation to be transmitted to the network connected device.

22. The computing system of claim 21, wherein the operations further comprise:
   responsive to failing to reverify that the set of rules are satisfied at the time the second command invocation is at the transmission position of the cloud queue, causing the command invocation to be forgotten.

\* \* \* \* \*